US010839137B2

(12) United States Patent
Li (10) Patent No.: US 10,839,137 B2
(45) Date of Patent: Nov. 17, 2020

(54) METHOD AND APPARATUS FOR PLAYING VIDEO IN INDEPENDENT WINDOW BY BROWSER, AND STORAGE MEDIUM

(71) Applicant: TENCENT TECHNOLOGY (SHENZHEN) COMPANY LIMITED, Shenzhen (CN)

(72) Inventor: Zhun Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 73 days.

(21) Appl. No.: 16/201,840

(22) Filed: Nov. 27, 2018

(65) Prior Publication Data

US 2019/0129923 A1 May 2, 2019

Related U.S. Application Data

(63) Continuation of application No. PCT/CN2017/098840, filed on Aug. 24, 2017.

(30) Foreign Application Priority Data

Aug. 26, 2016 (CN) .......................... 2016 1 0740979

(51) Int. Cl.
*G06F 40/106* (2020.01)
*G06F 16/957* (2019.01)
(Continued)

(52) U.S. Cl.
CPC .......... *G06F 40/106* (2020.01); *G06F 3/0481* (2013.01); *G06F 16/9577* (2019.01);
(Continued)

(58) Field of Classification Search
CPC ................................................ H04N 21/4438
See application file for complete search history.

(56) References Cited

U.S. PATENT DOCUMENTS

| 7,788,583 B1* | 8/2010 | Amzallag | .......... H04N 21/4143 |
| | | | 715/719 |
| 2013/0145267 A1* | 6/2013 | Ramachandran | ... G06F 3/04845 |
| | | | 715/719 |

(Continued)

FOREIGN PATENT DOCUMENTS

| CN | 101504648 A | 8/2009 |
| CN | 101515288 A | 8/2009 |

(Continued)

OTHER PUBLICATIONS

"Expandable Project Presentation"; Dec. 31, 2014; CodyHouse; https://codyhouse.co/gem/expandable-project-presentation.*

(Continued)

*Primary Examiner* — Asher D Kells
(74) *Attorney, Agent, or Firm* — Anova Law Group, PLLC (57) ABSTRACT

A method and an apparatus for playing a video in an independent window by a browser are provided. The video may be played in the independent window without installing a plug-in in the browser. The method includes: detecting an operating position of a user operation in a web page of the browser, and determining whether the operating position is in a video area in the web page. The method also includes acquiring a video element corresponding to the operating position in the web page if the operating position is in the video area; and filling a visible area of the web page with video content by applying a preset full-view style to the video element. The method also includes: creating an independent window different from window containing the web page, and transferring the video content of the web page into the independent window for playing.

20 Claims, 7 Drawing Sheets

(51) Int. Cl.
  *G06F 3/0481* (2013.01)
  *H04N 21/4782* (2011.01)
  *H04N 21/431* (2011.01)
  *H04N 21/443* (2011.01)

(52) U.S. Cl.
  CPC ..... *H04N 21/4314* (2013.01); *H04N 21/4438* (2013.01); *H04N 21/4782* (2013.01)

(56) References Cited

U.S. PATENT DOCUMENTS

2014/0082498 A1* 3/2014 Xiang .................. G06F 3/0484
  715/719
2015/0365306 A1* 12/2015 Chaudhri .............. G06F 3/0416
  715/736

FOREIGN PATENT DOCUMENTS

| CN | 101587489 A | 11/2009 |
| CN | 103338384 A | 10/2013 |

OTHER PUBLICATIONS

The World Intellectual Property Organization (WIPO) International Search Report for PCT/CN2017/098840 dated Nov. 1, 2017 6 Pages (including translation).

* cited by examiner

FIG. 5

METHOD AND APPARATUS FOR PLAYING VIDEO IN INDEPENDENT WINDOW BY BROWSER, AND STORAGE MEDIUM

CROSS-REFERENCES TO RELATED APPLICATIONS

This application is a continuation application of PCT Patent Application No. PCT/CN2017/098840, filed on Aug. 24, 2017, which claims priority to Chinese Patent Application No. 201610740979.5, entitled "Method and Apparatus for Playing Video in Independent Window by Browser" filed on Aug. 26, 2016, the entire contents of both of which are incorporated herein by reference.

FIELD OF THE TECHNOLOGY

The present disclosure relates to the technical field of computers, in particular to a method and an apparatus for playing a video in an independent window by a browser, and a storage medium.

BACKGROUND OF THE DISCLOSURE

Hyper text markup language (HTML) web pages are widely applied. Currently, web pages seen by users surfing the Internet are mostly authored by HTML. Hyper text refers to a text that may include non-text elements such as videos, pictures, links, music, and programs. Markup refers to the fact that these hyper texts must be marked up with start and end tags including attributes. A browser may display content of a web page by decoding HTML.

A browser plug-in is often used in current HTML pages. The plug-in is a program authored by an application program interface following a certain standard. The browser can directly call a plug-in program to process a specific type of file. For example, Flash is widely used as a standard for interactive vector graphics and web page animation. Flash is authoring software integrating animation creation and application program development. A Flash application program including rich media may be created by adding pictures, sounds, videos, and special effects. Online video streaming may be implemented by using Flash technology in the web pages. The browser plays a Flash video through a Flash Player plug-in. However, in a solution of installing a plug-in in an HTML page to implement video playing, it is necessary to first download the plug-in program from a plug-in server, and then install and run the plug-in program in the browser, resulting in a complex operation process; the plug-in program may also be updated, so that the plug-in program needs to be reinstalled in the browser, or an update package needs to be installed, which all bring the complex operation problem when the plug-in is installed in the browser to implement video playing. For another example, in the fifth major revision of hyper text markup language, namely, an H5 standard specification, H5 provides a brand new framework and platform for the next-generation Internet, but the H5 standard specification does not support the use of the Flash plug-in to play the video, so that the video cannot be played in H5 pages by installing the plug-in.

SUMMARY

The embodiments of the present disclosure provide a method and an apparatus for playing a video in an independent window by a browser, and a storage medium. The video may be played in the independent window without installing a plug-in in the browser, and the implementation process is simple and easy to operate.

In order to solve the foregoing technical problems, the embodiments of the present disclosure provide the following technical solutions:

In one aspect, an embodiment of the present disclosure provides a method for playing a video in an independent window by a browser. The method is executed by a processor in a terminal, and includes: detecting an operating position of a user operation in a web page of the browser, and determining whether the operating position is in a video area in the web page. The method also includes acquiring a video element corresponding to the operating position in the web page if the operating position is in the video area; and filling a visible area of the web page with video content by applying a preset full-view style to the video element. The method also includes: creating an independent window different from window containing the web page, and transferring the video content of the web page into the independent window for playing.

In another aspect, an embodiment of the present disclosure further provides an apparatus for playing a video in an independent window by a browser. The apparatus includes one or more processor and a storage medium storing operation instructions. The one or more processor is configured to perform: detecting an operating position of a user operation in a web page of the browser, and determining whether the operating position is in a video area in the web page. The processor is also configured to perform: acquiring a video element corresponding to the operating position in the web page if the operating position is in the video area; and filling a visible area of the web page with video content by applying a preset full-view style to the video element. The processor is also configured to perform: creating an independent window different from window containing the web page, and transferring the video content of the web page into the independent window for playing.

In another aspect, a non-transitory computer readable storage medium is provided. The storage medium stores computer program instructions executable by at least one processor. The computer program instructions can cause the at least one processor to perform: detecting an operating position of a user operation in a web page of the browser, and determining whether the operating position is in a video area in the web page. The computer program instructions also cause the at least one processor to perform: acquiring a video element corresponding to the operating position in the web page if the operating position is in the video area; and filling a visible area of the web page with video content by applying a preset full-view style to the video element. The computer program instructions also cause the at least one processor to perform: creating an independent window different from window containing the web page, and transferring the video content of the web page into the independent window for playing.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings.

DESCRIPTION OF EMBODIMENTS

The embodiments of the present disclosure provide a method and an apparatus for playing a video in an independent window by a browser. The video may be played in the independent window without installing a plug-in in the browser, and the implementation process is simple and easy to operate.

To make the objectives, features, and advantages of the present disclosure more obvious and comprehensible, the following clearly and completely describes the technical solutions in the embodiments of the present disclosure with reference to the accompanying drawings in the embodiments of the present disclosure. Apparently, the described embodiments below are merely some of the embodiments of the present disclosure rather than all of the embodiments. All other embodiments obtained by a person of ordinary skill in the art based on the embodiments of the present disclosure shall fall within the protection scope of the present disclosure.

The terms "include" and "have", and any variants thereof in the specification, the claims and the foregoing accompanying drawings in the present disclosure are intended to cover a non-exclusive inclusion. Therefore, in the context of a process, method, system, product, or device that includes a series of units, the process, method, system, product, or device is not limited to those units, but includes other units not specified expressly, or may include inherent units of the process, method, product, or device.

Figure 1:
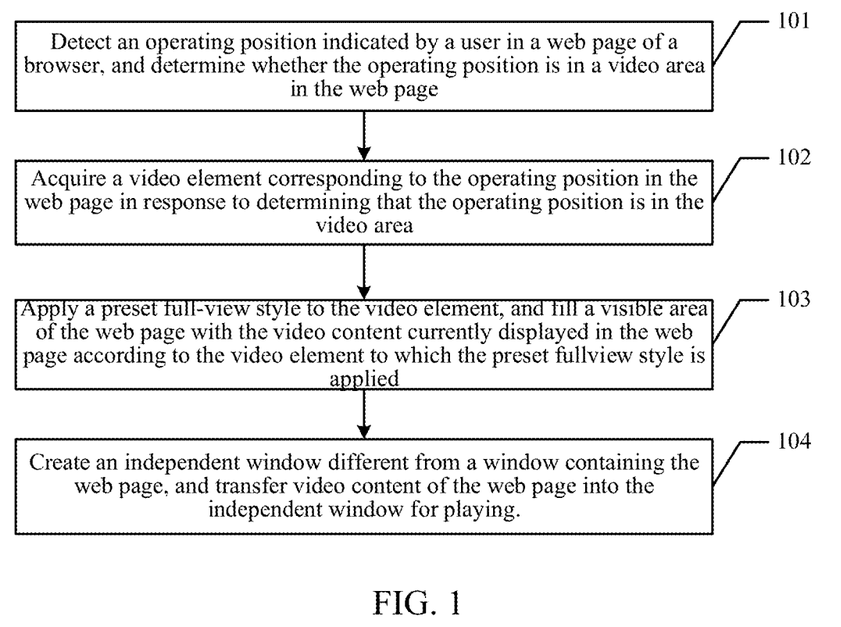
FIG. 1 is a schematic block diagram of a process of a method for playing a video in an independent window by a browser according to an embodiment of the present disclosure.

Detailed descriptions are made separately below. An embodiment of a method for playing a video in an independent window by a browser in the present disclosure may be specifically applied to an application scenario in which the video in the browser may be played through the independent window. Referring to FIG. 1, the method for playing a video in an independent window by a browser according to an embodiment of the present disclosure may include the following steps:

101: Detect an operating position of a user operation in a web page of the browser, and determine whether the operating position is in a video area in the web page or not.

In the embodiment of the present disclosure, hyper text contents such as videos, pictures, and hyperlinks are displayed in the web page of the browser. The user may operate the web page of the browser, for example, the user may operate the web page by using a mouse and a keyboard. The movement of the mouse on the web page indicates content of the page that the user needs to operate. For another example, the user may operate the web page by a touch screen, and the user may indicate the content of the page to be operated by operations such as clicking and sliding. In the embodiment of the present disclosure, the operating position of the user operation is detected in real time in the web page of the browser, so as to determine a corresponding page position of the operating position currently based on the user operation in the web page. In the web page, a corresponding video area may be configured according to a video element, so as to judge whether the operating position based on the user operation is in the video area in the web page. For example, the video area configured in the web page is a rectangular area, when the operating position based on the user operation enters the scope of the video area, it may be determined that the operating position is in the video area; otherwise, the operating position is not in the video area.

In some embodiments of the present disclosure, step 101 of detecting the operating position based on the user operation in the web page of the browser may include the following steps:

A1: Generate a mouse move event according to a movement operation of the mouse controlled by the user in the web page of the browser; and A2: Detect the mouse move event in the web page to generate the operating position of the user operation.

The operating position of the user operation may be determined by controlling the mouse by the user. For example, if the user controls the mouse to move in the web page of the browser, the mouse move event is generated according to the movement operation of the mouser controlled by the user, and the operating position of the user operation may be acquired by analyzing the mouse move event. It is not limited that in the embodiment of the present disclosure, the operating position based on the user operation may be not limited to the movement of the mouser, but may also refer to an operating position determined by moving a cursor in a keyboard by the user, and may also refer to an operating position determined by detecting a click event clicked by the user in a touch screen.

It should be noted that in some embodiments of the present disclosure, after determining whether the operating position is in the video area in the web page or not in step 101, the method for playing the video in the independent window by the browser according to the embodiment of the present disclosure may further include the following steps:

B1: Prompt (e.g., in the video area of the web page) the user whether to create an independent window or not if the operating position is in the video area, and trigger to perform the following step 102: detecting a user selection on creating an independent window (e.g., showing the video content in an independent pop-up window), acquiring a video element corresponding to the operating position in the web page in response to detecting the user selection.

When it is detected that the operating position is in the video area, the user may be prompted through the web page whether to create the independent window or not. For example, the user is prompted whether to open video content in a popup window or not. When the user determines that the independent window may be created, performing of step 102 is triggered, otherwise, the entire process is ended. By prompting the user whether to create the independent window or not, the video may be played in the independent window according to an instruction of the user, and the independent window may not be created when the user indicates that the independent window does not need to be used.

102: Acquire the video element corresponding to the operating position in the web page if the operating position is in the video area.

In the embodiment of the present disclosure, when it is detected that the operating position based on the user operation is in the video area of the web page, it is indicated that video playing is needed in the web page, and at this time, the video element corresponding to the operating position in the web page is acquired. For example, a video area may be defined for the video element in the web page, and the video element configured by the video area may be acquired when the operating position based on the user operation enters the video area. The vide element may also be defined as a multimedia playing element, and the video element may be used for playing video files in the browser. For example, the video element may include: fifth-generation application hyper text markup language (HTML), namely, a video element configured in an H5 web page. The video element may be used for playing videos on a network. The plug-in does not need to be used in the browser by use of the video element, and the video files may be played only by the video element.

103: Apply a preset full-view style to the video element, and fill a full-view video area with the video content currently displayed in the web page according to the video element to which the full-view style is applied. The full-view video area is larger than the default video area originally assigned to the video element. In one embodiment, the full-view video area is the entire visible area of the web page shown on a display screen.

In the embodiment of the present disclosure, after the video element configured in the web page is acquired, specific cascading style sheets (CSS for short) may be applied to the video element. To fill up a visible area of a current web page with the video content, the full-view style may be pre-configured in the embodiment of the present disclosure. The full-view style is CSS implementing a filling effect of the page. After the full-view style is applied to the video element, the full-view video area may be filled with the video content currently displayed in the web page according to the video element to which the full-view style is applied. For example, the video content currently displayed in the web page only occupies part of the visible area of the web page. Through the full-view style configured in the video element, the visible area may be filled up with the video content currently displayed in the web page, namely, a layout of the current web page may be occupied entirely by the full-view video area. The current web page refers to a web page that the user is viewing through the browser, for example, a web page including video content and newly opened by clicking on a web page link by the user. The web page may include contents other than the video content, such as text content and image content. By applying the full-view style to the video element, the visible area in the current web page may be filled with the video content currently displayed (e.g., without displaying the contents other than the video content), and the video content played in the current web page is laid out and rendered according to the currently applied video element.

In some embodiments of the present disclosure, step 103 of filling the full-view video area with the video content currently displayed in the web page according to the video element to which the full-view style may include the following steps:

C1: Apply the full-view style to the video element and rearrange a layout of the visible area of the web page based on the full-view style.

When the full-view video area in the web page is filled with the video content currently displayed, the layout of the entire web page may also be rearranged according to a predetermined style of a system. In some embodiments, the rearranged web page may be displayed after the layout is completed, so that the layout is adjusted again after the newly configured video element is applied to the video area, so as to adapt the user to browse through the web page. A specifically adopted layout manner may be determined in combination with an application scenario, and is not limited herein. In some embodiments, the rearranged layout of the visible area of web page may not displayed, and is used for rendering and displaying same content in a new window.

104: Create an independent window different from a window containing the web page, and transfer the video content of the web page into the independent window for playing.

In the embodiment of the present disclosure, after the video content displayed in the video area of the current web page fills up the full-view video area in step 103, an independent window may be created, and the independent window is independent of a browser window containing the current web page. The video content of the web page may be carried by the created independent window, and the video content originally displayed in the video area may be transferred into the independent window for playing. The video content is continuously played by the newly created independent window, so as to provide the user with a better online video watching effect. The video content may be played in the independent window without installing a video plug-in in the browser, so that a load operation caused by frequent update of the plug-in is avoided. Video playing in the independent window is completed through the web page's own characteristics (e.g., changing CSS style and layout), and the implementation process is simple and easy to operate.

In some embodiments of the present disclosure, after creating the independent window different from the web page, and transferring the video content displayed in the video area into the independent window for playing in step 104, the method for playing the video in the independent window by the browser according to the embodiment of the present disclosure may further include the following steps:

D1: Remove the full-view style from the video element, and apply a default layout style to the video element;

D2: Transfer the video content currently played in the independent window into the video area of the web page, and close the independent window; and D3: Rearrange a layout of the web page according to the video element to which the default layout style is applied, and display the web page having the rearranged layout.

In the foregoing embodiments of the present disclosure, an implementation manner of creating the independent window to play the video content is described. After the performing of step 104 is completed, the closing operation of the independent window in step D1 to step D3 may also be executed, namely, step D1 is firstly performed, the full-view style is removed from the video element, and the default layout style is applied to the video element. By re-configuring the style in the video element, the full-view style is no longer applied, but the video element is configured according to the default layout style. Then the video content currently played in the independent window is transferred into the video area of the web page, then the independent window is closed, and the video content played in the independent window is restored to the video area of the web page. Finally, the web page may be re-laid out according to the video element to which the default layout style is applied, and the web page re-laid out is displayed. Through the closing operation of the independent window in step D1 to step D3, the video content may be restored to the video area of the web page from the independent window for continuously playing, and the user may still browse through the video content through the video area.

In some other embodiments of the present disclosure, after creating the independent window different from the web page, and transferring the video content displayed in the video area into the independent window for playing in step 104, the method for playing the video in the independent window by the browser according to the embodiment of the present disclosure may further include the following steps:

E1: Determine whether a window closing operation sent by the user on the independent window is detected or not, and trigger to perform the following steps D1: removing the full-view style from the video element, and applying the default layout style to the video element, when the window closing operation is detected.

Before step D1 is performed, whether the user issues the window closing operation or not also may be firstly detected. If the window closing operation is detected, then step D1 may be performed in response to a closing instruction of the user. If no window closing operation is detected, the independent window may be continuously used for playing the video content.

It can be seen from the above description of the embodiments of the present disclosure that in the embodiment of the present disclosure, the full-view style may be applied to the video element, so that the video area of the web page may be filled with the video content currently displayed in the web page, and the video content displayed in the video area may be transferred into the created independent window for continuously playing. In the embodiment of the present disclosure, the full-view style is directly configured in the video element in the web page to complete video playing in the independent window. Therefore, the video may be played without installing a video playing plug-in in the browser, so that the load operation caused by frequent update of the plug-in is avoided. Video playing in the independent window is completed through the web page's own characteristics, and the implementation process is simple and easy to operate.

To facilitate better understanding and implementation of the foregoing solutions of the embodiments of the present disclosure, corresponding application scenarios will be specifically described below as examples. Next, the implementation that the H5 page is supported in the browser is taken as an example. In HTML5 technology, online video streaming may be played by using a <video> tag of HTML5. The technology that Flash videos are played in an independent window cannot support a <video> video in HTML5 in the existing technology. In the embodiment of the present disclosure, a video playing function of the independent window of the browser can support the <video> video of HTML5. The HTML5 video is defined by an HTML5 standard, and is played by the HTML5-supporting browser itself. Flash is implemented by a plug-in mechanism of the browser, and thus a Flash video may be played by installing a Flash player plug-in.

Figure 2:
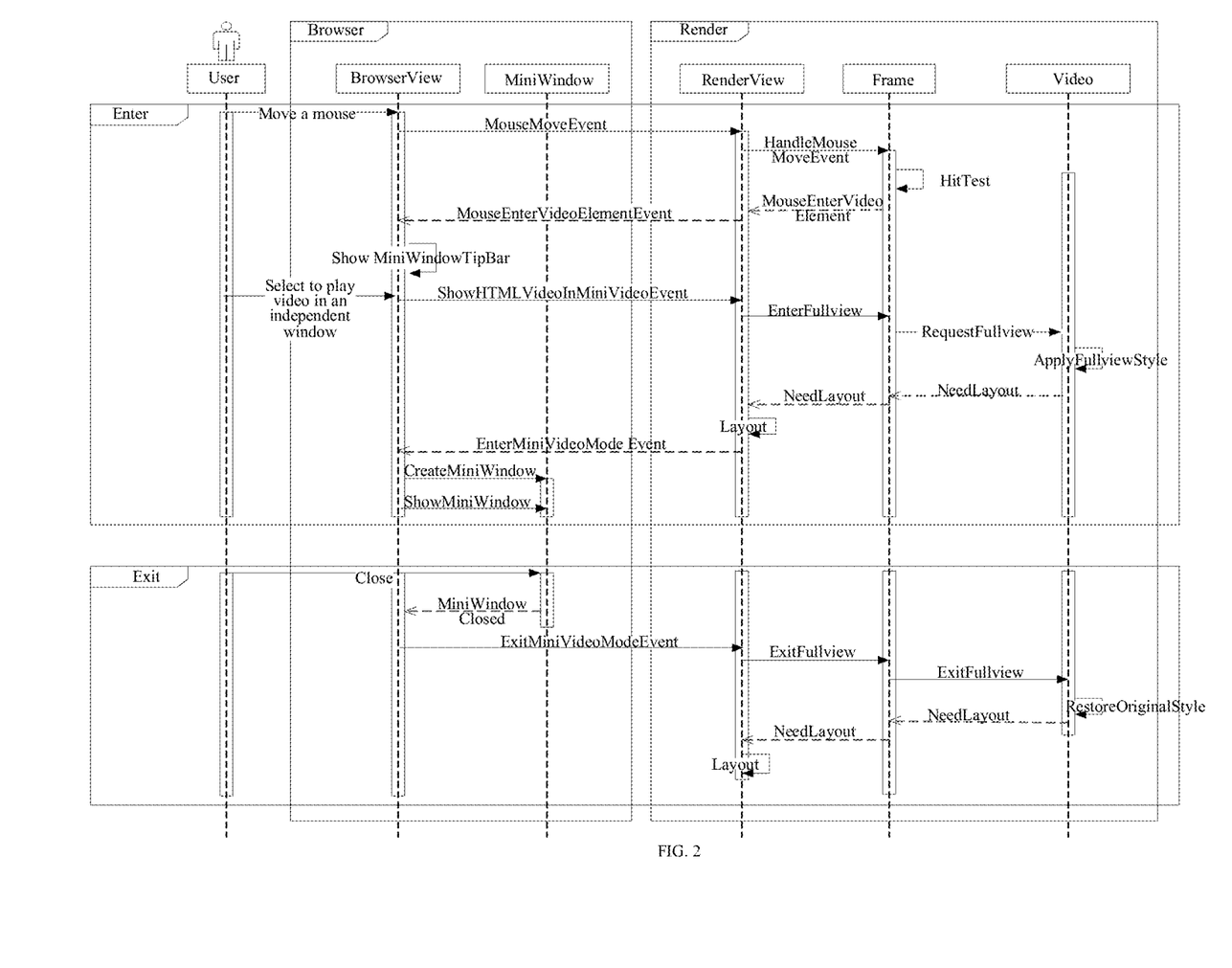
FIG. 2 is a schematic diagram of an implementation process of playing a video in an independent window by a browser according to an embodiment of the present disclosure.

Referring to FIG. 2, FIG. 2 is a schematic diagram of an application scenario of playing a video in an independent window by a browser according to an embodiment of the present disclosure. In the embodiment of the present disclosure, online video streaming in the <video> tag of HTML5 may be played through the independent window. First of all, terms appearing in FIG. 2 are explained. HTML5 is a new-generation HTML that may build a content-rich web page. <video> is a new tag introduced by HTML 5 and is used for defining online video streaming. CSS is a computer language used to represent file styles such as HTML or XML (a subset of standard generalized markup languages), and may be used to control styles and layouts of the web page. The independent window is a visible window independent of a main window of the browser. In this example, the main window of the browser may refer to a page window opened by the user through the browser (e.g., a window showing the current web page). The independent window is customized to implement a specific function, and its interface style may be different with the main window of the browser. Mini-Window is a representation of the independent window when the technology is implemented. Fullview indicates that a visible area of a current page is filled with a layout of a certain element of the page. FullviewStyle is CSS capable of implementing a Fullview effect. The Browser is responsible for the display of a browser interface and the management of the page. BrowserView is an important submodule in the Browser, and is responsible for user operation processing, communication with RenderView, presentation of rendering results of Render, and display of new windows. Render is a renderer that is responsible for the rendering work of the web page. The rendering results of the page are delivered to the Browser for displaying. In the embodiment of the present disclosure, CSS capable of implementing the Fullview effect, that is FullviewStyle, is first built in the browser. When the user browses through the web page, Render notifies the Browser to display a prompt to prompt the user that a video may be played through the independent window when Render detects that currently a mouse enters a video area defined by the <video> tag. If the user chooses to play the video through the independent window according to the prompt, Browser will notify Render that the video needs to be displayed in the independent window, Render will apply built-in FullviewStyle to a <video> element corresponding to the video, and then notify the Browser to create an independent window and display the current page in the new independent window. When the user closes the independent window that is playing a video, the Browser closes the independent window, displays the page in the main window of the browser, and notifies the Render to restore the page, and the Render will restore a default CSS style corresponding to the <video> element.

In some embodiments, the FullviewStyle may be embedded in the browser application when developing the browser application. The FullviewStyle may also be used for other functions of the browser. In one embodiment, the FullviewStyle of a video element is added to Render and defined by using the following code.

```
video:-webkit-full-view, audio:-webkit-full-view {
    background-color: transparent !important;
    position: relative !important;
    left: 0 !important;
    top: 0 ! important;
    margin: 0 !important;
    min-width: 0 !important;
    max-width: none !important;
    min-height: 0 !important;
    max-height: none !important;
    width: 100% !important;
    height: 100% !important;
    flex: 1 !important;
    display: block !important;
    transform: none !imporant;
}
```

Figure 3A:
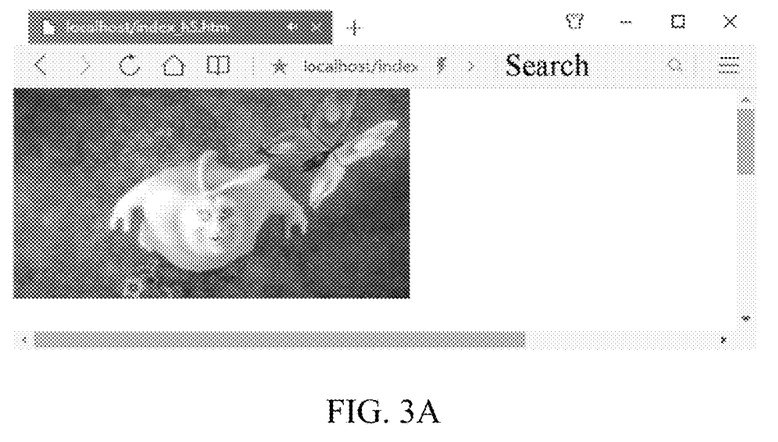
FIG. 3A is a schematic diagram of browser display of an online video implemented by a video element in a browser according to an embodiment of the present disclosure.
Figure 3B:
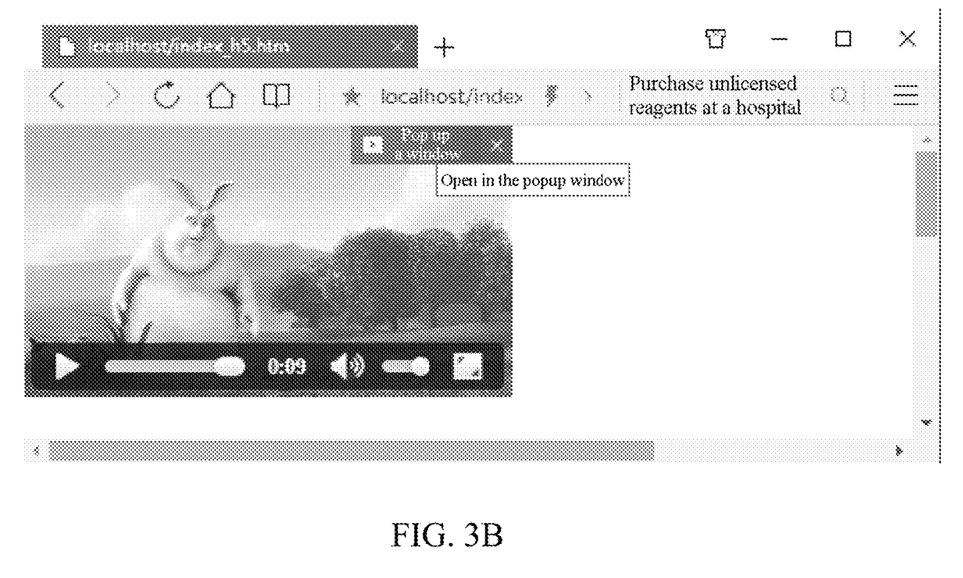
FIG. 3B is a schematic diagram of detecting a movement operation of a mouse controlled by a user in a browser according to an embodiment of the present disclosure.
Figure 3C:
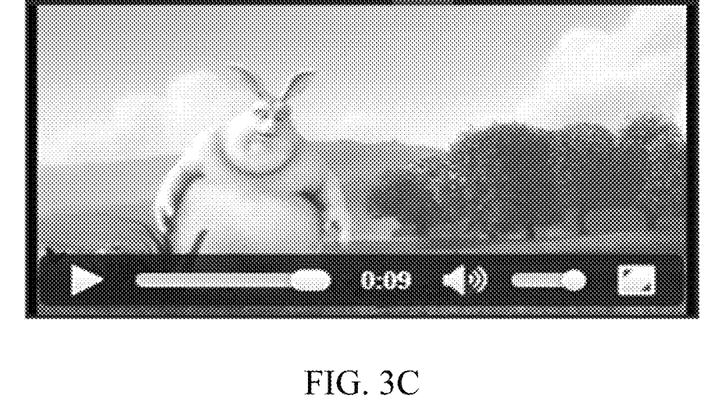
FIG. 3C is a schematic diagram of a playing interface for playing a video in an independent window by a browser according to an embodiment of the present disclosure.

Refer to FIG. 3A, FIG. 3B and FIG. 3C. FIG. 3A is a schematic diagram of browser display of an online video implemented by a video element in a browser according to an embodiment of the present disclosure, for example, an online video implemented by QQ browser rendering through the <video> tag of HTML5. FIG. 3B is a schematic diagram of detecting a movement operation of a mouse controlled by a user in a browser according to an embodiment of the present disclosure, and a prompt displayed when the mouse enters the video area is shown in FIG. 3B. FIG. 3C is a schematic diagram of a playing interface for playing a video in an independent window by a browser according to an embodiment of the present disclosure. The independent window in which the <video> video in HTML5 is played is a new window independent of a window containing the current web page, and is used to display video content of the web page corresponding to the HTML5 video.

The following describes an implementation time sequence process of the detailed solutions in the embodiments of the present disclosure. First, a time sequence of entering the independent window is described, and mainly includes the following steps:

1: Move a mouse by a user;

2: Generate a mouse event MouseMoveEvent according to a current mouse position, and then pass the mouse event to RenderView through inter-process communication (IPC for short) messages by BrowserView, wherein Browser and Render may send message notifications to each other through IPC to implement communication;

3: Receive the mouse event MouseMoveEvent sent by BrowserView through IPC, and call a HandleMouseMoveEvent related method of Frame corresponding to a web page according to mouse position information in the event by RenderView;

4: First call an own HitTest method to find a video element corresponding to the position in the mouse event when HandleMouseMoveEvent is called from Frame, and call a MouseEnterVideoElement method of RenderView if an element type is HTML5<video> video, and record the element to be convenient for directly finding the element, i.e., Video in a time sequence diagram, in a follow-up operation;

5: Send this IPC message of MouseEnterVideoElement to BrowserView when MouseEnterVideoElement is called from RenderView;

6: Call an own ShowMiniWindowTipBar method and display a prompt message and an operation method for entering MiniWindow to the user after BrowserView receives this IPC message of MouseEnterVideoElementEvent;

7: Operate to enter a video display mode of the independent window by the user according to the prompt;

8: Send an IPC message of ShowHTMLVideoInMiniVideoEvent to RenderView by BrowserView in response to receiving a user selection to enter the video display mode using an independent window;

9: Call an EnterFullview method of Frame after RenderView receives this IPC message of ShowHTMLVideoInMiniVideoEvent;

10: Call a RequestFullview method of a Video element after the EnterFullview method is called from Frame;

11: Call its own ApplyFullviewStyle method by Video after the RequestFullview method is called from Video, wherein FullviewStyle is applied to the Video element in the method and then a NeedLayout method of Frame is called in the ApplyFullviewStyle method;

12: Call a NeedLayout method of RenderView after the NeedLayout method is called from Frame;

13: Call an own Layout method by RenderView to re-lay out the entire web page (e.g., rearrange a layout of the visible area of the web page) after the NeedLayout method of RenderView is called, and send this IPC message of EnterMiniVideoModeEvent to BrowserView; and 14: First call CreateMiniWindow to create an independent video window MiniWindow after BrowserView receives this IPC message of EnterMiniVideoModeEvent, then remove the video element of the current web page from a browser window, and then call ShowMiniWindow to display the video content in the new independent window. In some embodiments, while the video content is displayed in the independent window, contents other than the video content of the current web page may still be displayed in original window according to an rearranged layout.

The following describes a time sequence of exiting from the independent window, which mainly includes the following steps:

1: Close MiniWindow by the user;

2: Call a MiniWindowClosed method of BrowserView by MiniWindow;

3: Send this IPC message of ExitMiniVideoModeEvent to RenderView after MiniWindowClosed of BrowserView is called;

4: Call an ExitFullview method of Frame after RenderView receives this IPC message of ExitMiniVideoModeEvent;

5: Call an ExitFullview method of Video by Frame;

6: Remove FullviewStyle by Video, then apply own RestoreOrignialStyle to restore a default style of a system, and then call the NeedLayout method of Frame;

7: Call the NeedLayout method of RenderView by Frame; and

8: Call the own Layout method by RenderView to re-lay out the entire web page.

It can be seen from the foregoing description of the examples of the present disclosure that in the embodiment of the present disclosure, the built-in FullviewStyle adds new built-in CSS to the browser, and a specific page element is positioned according to the mouse position, so that the <video> tag of the page is positioned by the mouse, and the style of the page element is changed in Render. In the embodiment of the present disclosure, FullviewStyle may be applied to the <video> tag and a default CSS style of <video> may be restored, the <video> element in the page is positioned by the mouse in Render, the message notification between Render and Browser is implemented, and the show of prompt messages in Browser and the independent window for displaying the page are implemented. The built-in FullviewStyle is applied to the <video> element in the Render to re-lay out the entire web page, so that a visible area of a current browser page is filled with the <video> element, and then Browser is notified to display the visible area filled with the <video> element in the independent window. When the independent window is closed, the page is displayed in the original main window of the browser, and Render is notified to restore CSS of <video> to re-lay out. In the embodiment of the present disclosure, a better online video watching effect may be provided for the user by configuring the full-view style for the video element of the browser and removing the full-view style.

It should be noted that the foregoing method embodiments are all expressed as a series of action combinations for the sake of simple description, but those skilled in the art should know that the present disclosure is not limited to the described action sequence because certain steps may be performed in other sequences or simultaneously according to the present disclosure. Secondly, those skilled in the art should also understand that the embodiments described in the specification all belong to preferred embodiments and the involved actions and modules are not necessarily required by the present disclosure.

To facilitate better implementation of the above solutions of the embodiments of the present disclosure, a related apparatus for implementing the above solutions is also provided below.

Figure 4A:
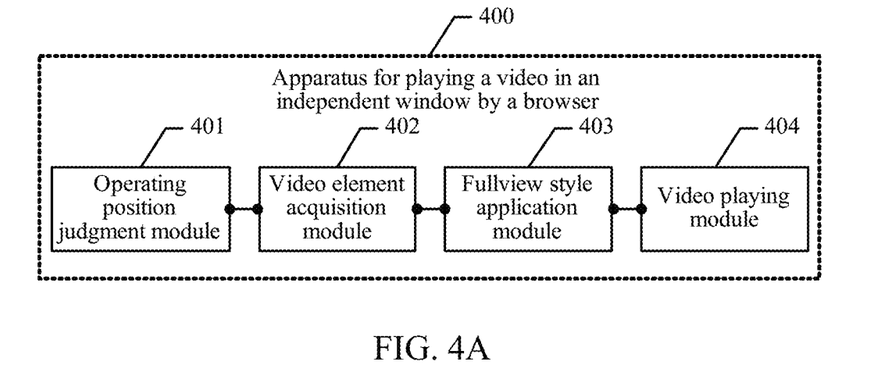
FIG. 4A is a schematic structural composition diagram of an apparatus for playing a video in an independent window by a browser according to an embodiment of the present disclosure.

Referring to FIG. 4A, an apparatus 400 for playing a video in an independent window by a browser according to an embodiment of the present disclosure may include: an operating position judgment module 401, a video element acquisition module 402, a full-view style application module 403, and a video playing module 404.

The operating position judgment module 401 is configured to detect an operating position indicated by a user in a web page of the browser, and judge whether the operating position is in a video area in the web page or not.

The video element acquisition module 402 is configured to acquire a video element corresponding to the operating position in the web page if the operating position is in the video area.

The full-view style application module 403 is configured to apply a preset full-view style to the video element so as to fill a visible area of the web page with the video content currently displayed in the web page according to the video element to which the full-view style is applied.

The video playing module 404 is configured to create an independent window different from the web page, and transfer video content of the web page into the independent window for playing.

Figure 4B:
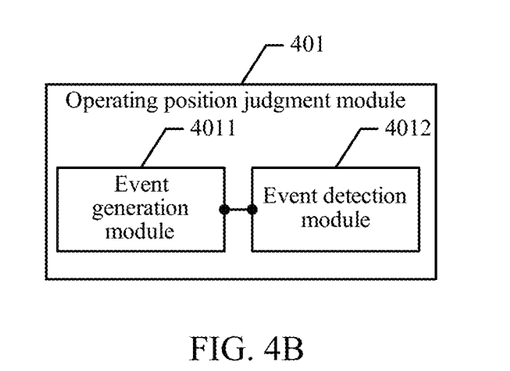
FIG. 4B is a schematic structural composition diagram of an operating position judgment module according to an embodiment of the present disclosure.

In some embodiments of the present disclosure, referring to FIG. 4B, the operating position judgment module 401 includes:

an event generation module 4011, configured to generate a mouse move event according to a movement operation of a mouse controlled by the user in the web page of the browser; and an event detection module 4012, configured to detect the mouse move event in the web page to generate an operating position based on the user operation.

Figure 4C:
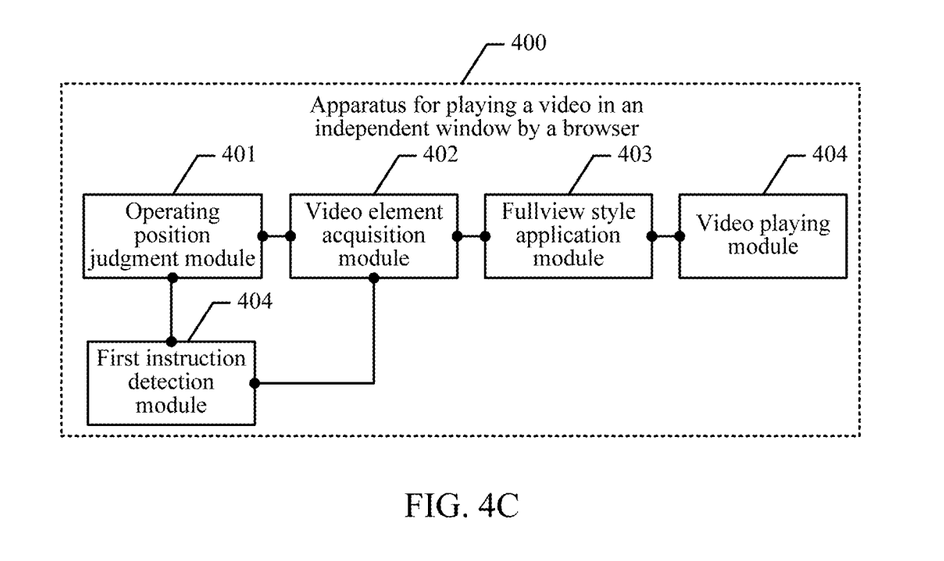
FIG. 4C is a schematic structural composition diagram of another apparatus for playing a video in an independent window by a browser according to an embodiment of the present disclosure.

In some embodiments of the present disclosure, referring to FIG. 4C, the apparatus 400 for playing the video in the independent window by the browser also includes:

a first instruction detection module 405, configured to prompt the user whether to create the independent window or not if the operating position is in the video area after the operating position judgment module 401 judges whether the operating position is in the vide area in the web page or not, and trigger to execute the video element acquisition module 402 when it is acquired that the user indicates that the independent window needs to be created.

Figure 4D:
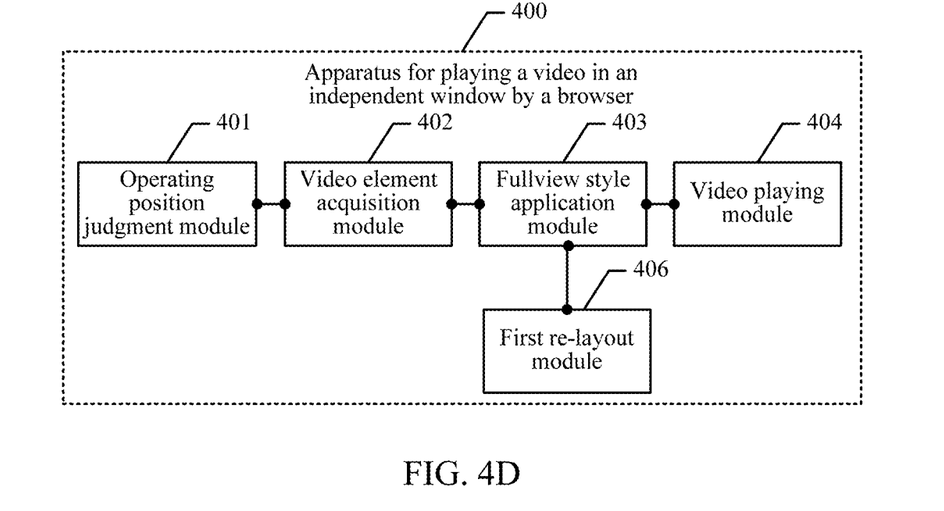
FIG. 4D is a schematic structural composition diagram of another apparatus for playing a video in an independent window by a browser according to an embodiment of the present disclosure.

In some embodiments of the present disclosure, referring to FIG. 4D, the apparatus 400 for playing the video in the independent window by the browser further includes:

a first re-layout module 406, configured to re-lay out the web page e.g., rearrange a layout of the visible area of the web page based on the preset full-view style. In some embodiments, the first re-layout module 406 may be further configured to display the web page re-laid out after the full-view style application module 403 fills the video area with the video content currently displayed in the web page according to the video element to which the full-view style is applied.

Figure 4E:
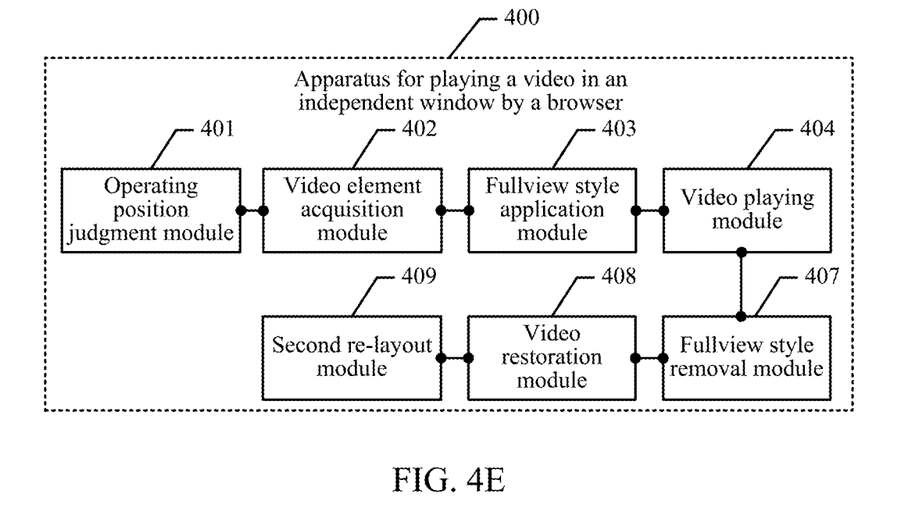
FIG. 4E is a schematic structural composition diagram of another apparatus for playing a video in an independent window by a browser according to an embodiment of the present disclosure.

In some embodiments of the present disclosure, referring to FIG. 4E, the apparatus 400 for playing the video in the independent window by the browser further includes:

a full-view style removal module 407, configured to removal the full-view style from the video element, and apply a default layout style to the video element after the video playing module 404 creates the independent window different from the web page, and transfers the video content displayed in the video area into the independent window for playing;

a video restoration module 408, configured to transfer the video content currently played in the independent window into the video area of the web page, and then close the independent window; and a second re-layout module 409, configured to re-lay out the web page according to the video element to which the default layout style is applied, and display the web page re-laid out.

Figure 4F:
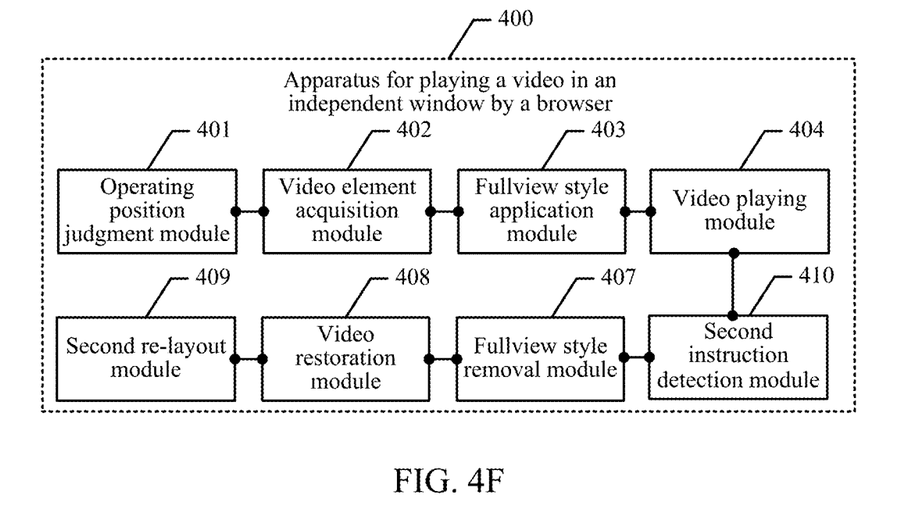
FIG. 4F is a schematic structural composition diagram of another apparatus for playing a video in an independent window by a browser according to an embodiment of the present disclosure.

Further, in some embodiments of the present disclosure, referring to FIG. 4F, relative to FIG. 4E, the apparatus 400 for playing the video in the independent window by the browser further includes:

a second instruction detection module 410, configured to judge whether a window closing operation sent by the user on the independent window is detected or not, and trigger to execute the full-view style removal module 407 when the window closing operation is detected, after the video playing module 404 creates the independent window different from the web page and transfers the video content in the web page into the independent window for playing.

It can be seen from the foregoing description of the embodiments of the present disclosure that in the embodiment of the present disclosure, the full-view style may be applied to the video element, so that the video area of the web page may be filled with the video content currently displayed in the web page, and the video content of the web page originally displayed in the video area may be transferred into the created independent window for continuously playing. In the embodiment of the present disclosure, the full-view style is directly configured in the video element in the web page to complete video playing in the independent window. Therefore, a video may be played without installing a video playing plug-in in the browser, so that a load operation caused by frequent update of the plug-in is avoided. Video playing in the independent window is completed through the web page's own characteristics, and the implementation process is simple and easy to operate.

Figure 5:
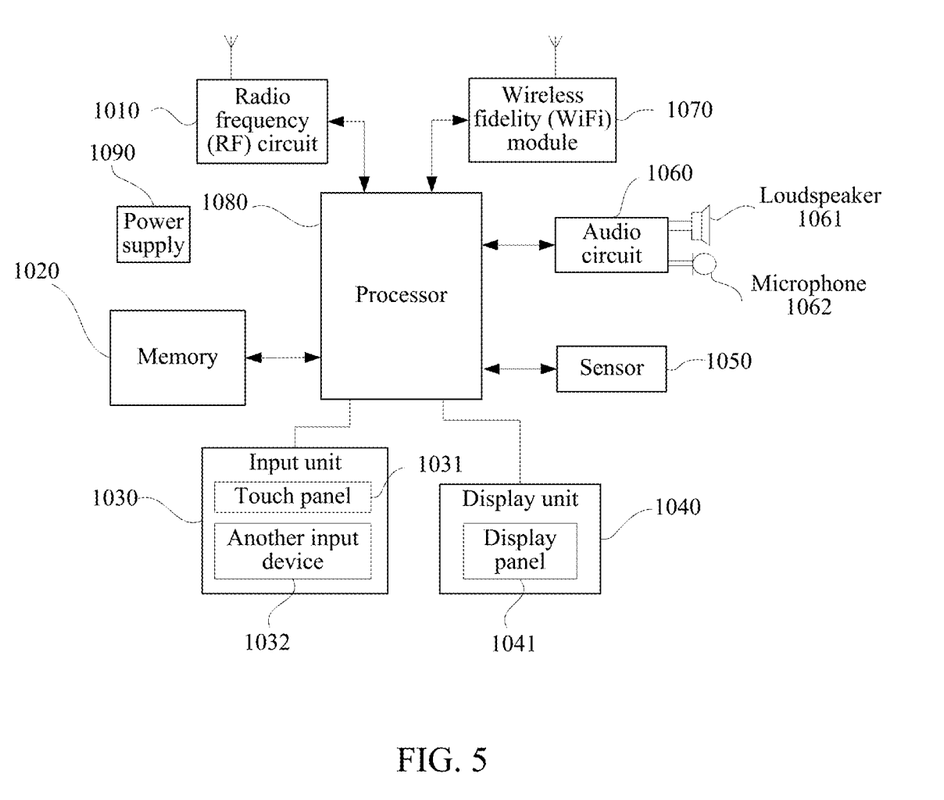
FIG. 5 is a schematic structural composition diagram of a terminal to which a method for playing a video in an independent window by a browser is applied according to an embodiment of the present disclosure.

The embodiment of the present disclosure further provides another terminal. As shown in FIG. 5, parts related to the embodiment of the present disclosure are only shown for facilitating description. Specific technical details not disclosed refer to the method part of the embodiment of the present disclosure. The terminal may include any terminal devices such as a mobile phone, a tablet computer, a PDA (Personal Digital Assistant), a POS (Point of Sales), and an onboard computer. The mobile phone as the terminal is taken as an example for description in FIG. 5.

FIG. 5 is a block diagram of the structure of a part of a mobile phone related to a terminal according to an embodiment of the present disclosure. Referring to FIG. 5, the mobile phone includes components such as a radio frequency (RF) circuit 1010, a memory 1020, an input unit 1030, a sensor 1050, an audio circuit 1060, a wireless fidelity (WiFi) module 1070, a processor 1080, and a power supply 1090. A person skilled in the art may understand that the structure of the mobile phone shown in FIG. 5 does not constitute a limitation to the mobile phone, and the mobile phone may include more components or fewer components than those shown in the figure, or some components may be combined, or a different component deployment may be used.

The following specifically describes the components of the mobile phone with reference to FIG. 5.

The RF circuit 1010 may be configured to receive and send signals during an information receiving and sending process or a call process. Particularly, the RF circuit 1010 receives downlink information from a base station, then delivers the downlink information to the processor 1080 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 1010 may also communicate with a network and another device by wireless communication. The wireless communication may use any communications standard or protocol, which includes, but is not limited to, Global system for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMA), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (such as a sound playback function and an image playback function), and the like. The data storage area may store data (such as audio data and an address book) created according to use of the mobile phone, and the like. In addition, the memory 1020 may include a high speed random access memory, and may also include a non-volatile memory such as at least one magnetic disk storage device, a flash memory, or another volatile solid-state storage device.

The input unit 1030 may be configured to receive input digit or character information, and generate a keyboard signal input related to the user setting and function control of the mobile phone. Specifically, the input unit 1030 may include a touch panel 1031 and another input device 1032. The touch panel 1031, which may also be referred to as a touch screen, may collect a touch operation of a user on or near the touch panel (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. Moreover, the touch controller can receive and execute a command sent from the processor 1080. In addition, the touch panel 1031 may be a resistive, capacitive, infrared, or surface sound wave type touch panel. In addition to the touch panel 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine the type of the touch event. Then, the processor 1080 provides a corresponding visual output on the display panel 1041 according to the type of the touch event. Although, in FIG. 5, the touch panel 1031 and the display panel 1041 are used as two separated parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as pedometer and a knock), and the like. Other sensors such as a gyroscope, a barometer, a hygrometer, a thermometer, and an infrared sensor, which may be configured in the mobile phone, are not further described herein.

The audio circuit 1060, a loudspeaker 1061, and a microphone 1062 may provide audio interfaces between the user and the mobile phone. The audio circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi belongs to a short distance wireless transmission technology. The mobile phone may help, by using the WiFi module 1070, the user to receive the send e-mails, browse a webpage, access streaming media, and so on, which provides wireless broadband Internet access for the user. Although FIG. 5 shows the WiFi module 1070, it may be understood that the WiFi module is not a necessary component of the mobile phone, and when required, the WiFi module may be omitted as long as the scope of the essence of the present disclosure is not changed.

The processor 1080 is the control center of the mobile phone, and is connected to various parts of the mobile phone by using various interfaces and lines. By running or executing the software program and/or module stored in the memory 1020, and invoking data stored in the memory 1020, the processor 1080 performs various functions and data processing of the mobile phone, thereby performing overall monitoring on the mobile phone. Optionally, the processor 1080 may include one or more processing units. Preferably, the processor 1080 may integrate an application processor and a modem. The application processor mainly processes an operating system, a user interface, an application program, and the like. The modem mainly processes wireless communication. It may be understood that the foregoing modem may also not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present disclosure, the processor 1080 included in the terminal further has a flow of controlling and executing the above method executed by the terminal.

In the embodiments of the present disclosure, the full-view style may be applied to the video element, so that the video area of the web page may be filled with the video content currently displayed in the web page, and the video content displayed in the video area may be transferred into the created independent window for continuously playing. In the embodiments of the present disclosure, the full-view style is directly configured in the video element in the web page to complete video playing in the independent window.

Therefore, the video may be played without installing a video playing plug-in in the browser, so that a load operation caused by frequent update of the plug-in is avoided. Video playing in the independent window is completed through the web page's own characteristics, and the implementation process is simple and easy to operate.

In addition, it should be noted that the apparatus embodiments described above are merely schematic. The units described as separate components may be or may not be physically separated, and the components displayed as units may be or may not be physical units, i.e., they may be positioned in one place, or may be distributed onto multiple network units. According to actual needs, some or all of the modules may be selected to implement the purpose of the solution of the embodiment. In addition, in the accompanying drawings of the apparatus embodiments according to the present disclosure, the connection relationship between the modules indicates that there is a communication connection between them, which may be specifically implemented into one or multiple communication buses or signal lines. It should be understood and implemented by a person of ordinary skill in the art without creative efforts.

Through the description of the above embodiments, those skilled in the art may clearly understand that the present disclosure may be implemented by means of software and necessary general hardware, and of course, may also be implemented by dedicated hardware including an application dedicated integrated circuit, a dedicated CPU, a dedicated memory, a dedicated component and the like. Under normal circumstances, all functions completed by a computer program may be easily implemented by corresponding hardware. Moreover, specific hardware structures configured to implement the same function may also be various, such as an analog circuit, a digital circuit, or a dedicated circuit. However, for the present disclosure, the software program implementation manner is a better implementation manner under more circumstances.

Based on such understanding, the present disclosure provides a computer readable storage medium, program instructions for executing the above method being stored in the computer readable storage medium. In the technical solution of the present disclosure, a part contributing to the existing technology may be embodied in the form of a software product in essence. The computer software product is stored in the readable storage medium such as a floppy disk of a computer, a USB flash disk, a mobile hard disk, a read-only memory (ROM), a random access memory (RAM), a magnetic disk or an optical disk, including a plurality of instructions used for enabling a computer device (may be a personal computer, a server, or a network device and the like) to execute the method described in each embodiment of the present disclosure.

In summary, the above embodiments are used only to illustrate the technical solutions of the present disclosure, and are not intended to limit the same. Although the present disclosure has been described in detail with reference to the above embodiments, those of ordinary skill in the art should understand that they may make modifications to the technical solutions recorded in the above embodiments, or equivalent replacements to partial technical characteristics. However, these modifications or replacements do not make the essence of the corresponding technical solutions depart from the spirit and scope of the technical solutions of the embodiments of the present disclosure.

What is claimed is:

1. A method for playing a video in an independent window by a browser, the method being executed by a processor in a terminal, and the method comprising:
   detecting an operating position of a user operation in a web page of the browser;
   determining whether the operating position is in a video area in the web page;
   acquiring a video element corresponding to the operating position in the web page in response to determining that the operating position is in the video area;
   filling a visible area of the web page with video content by applying a preset full-view style to the video element, including: activating, by the browser, a renderer of the web page to apply the full-view style to the video element, the full-view style being built in the browser during development of the browser;
   upon the renderer completes applying the built-in full-view style, creating an independent window different from a window containing the web page;
   transferring the video content of the web page into the independent window for playing; and
   re-arranging, by the renderer, a layout of the entire web page to adapt to browsing of contents other than the video element in the web page, after the full-view style is applied to the video element.

2. The method according to claim 1, wherein detecting the operating position based on the user operation in the web page of the browser comprises:
   generating a mouse move event according to a movement operation of a mouse controlled by a user in the web page of the browser; and
   detecting the mouse move event in the web page to generate the operating position of the user operation.

3. The method according to claim 1, wherein after determining whether the operating position is in the video area in the web page, the method also comprises:
   prompting, in the video area of the web page, whether to create an independent window in response to determining that the operating position is in the video area;
   detecting a user selection on creating the independent window; and
   acquiring the video element corresponding to the operating position in the web page in response to detecting the user selection.

4. The method according to claim 1, wherein after transferring the video content displayed in the web page into the independent window for playing, the method further comprises:
   removing the full-view style from the video element, and applying a default layout style to the video element;
   transferring the video content currently played in the independent window into the video area of the web page, and closing the independent window; and
   re-arranging a layout of the web page according to the video element to which the default layout style is applied, and displaying the web page having the rearranged layout.

5. The method according to claim 4, wherein after transferring the video content of the web page into the independent window for playing, the method further comprises:
   determining whether a window closing operation sent by the user on the independent window is detected; and
   removing the full-view style from the video element and applying the default layout style to the video element, when the window closing operation is detected.

6. The method according to claim 1, wherein the full-view style is cascading style sheets implementing a filling effect of the web page.

7. The method according to claim 1, wherein an interface of the independent window playing the video content is different from an interface of the window containing the web page.

8. The method according to claim 1, wherein the browser includes a browser submodule responsible for display of a browser interface and management of web pages and configured to send and receive inter-process communication (IPC) messages with the renderer.

9. The method according to claim 8, further comprising:
   notifying, by the browser submodule, the renderer to apply the full-view style to the video element through a first IPC message in response to determining that the operating position is in the video area; and
   upon receiving a second IPC message from the renderer indicating that the built-in full-view style is applied, creating, by the browser submodule, the independent window different from the window containing the web page.

10. An apparatus for playing a video in an independent window by a browser, the apparatus comprising one or more processor and a storage medium storing operation instructions, and the one or more processor is configured to perform:
    detecting an operating position of a user operation in a web page of the browser;
    determining whether the operating position is in a video area in the web page;
    acquiring a video element corresponding to the operating position in the web page in response to determining that the operating position is in the video area;
    filling a visible area of the web page with video content by applying a preset full-view style to the video element, including: activating, by the browser, a renderer of the web page to apply the full-view style to the video element, the full-view style being built in the browser during development of the browser;
    upon the renderer completes applying the built-in full-view style, creating an independent window different from a window containing the web page;
    transferring the video content of the web page into the independent window for playing; and
    re-arranging, by the renderer, a layout of the entire web page to adapt to browsing of contents other than the video element in the web page, after the full-view style is applied to the video element.

11. The apparatus according to claim 10, wherein the one or more processor is further configured to perform:
    generating a mouse move event according to a movement operation of a mouse controlled by a user in the web page of the browser; and
    detecting the mouse move event in the web page to generate the operating position based on the user operation.

12. The apparatus according to claim 10, wherein the one or more processor is further configured to perform:
    prompting, in the video area of the web page, whether to create an independent window in response to determining that the operating position is in the video area;
    detecting a user selection on creating the independent window; and
    acquiring the video element corresponding to the operating position in the web page in response to detecting the user selection.

13. The apparatus according to claim 10, wherein the one or more processor is further configured to perform:
removing the full-view style from the video element, and apply a default layout style to the video element after the video content displayed in the video area is transferred into the independent window for playing;
transferring the video content currently played in the independent window into the video area of the web page, and closing the independent window; and
re-arranging a layout of the web page according to the video element to which the default layout style is applied, and display the web page having the rearranged layout.

14. The apparatus according to claim 13, wherein the one or more processor is further configured to:
determining whether a window closing operation sent by the user on the independent window is detected; and
removing the full-view style from the video element, and applying the default layout style to the video element, when the window closing operation is detected.

15. The apparatus according to claim 10, wherein the full-view style is cascading style sheets implementing a filling effect of the web page.

16. A non-transitory computer readable storage medium storing computer program instructions executable by at least one processor to perform:
detecting an operating position of a user operation in a web page of the browser;
determining whether the operating position is in a video area in the web page;
acquiring a video element corresponding to the operating position in the web page in response to determining that the operating position is in the video area;
filling a visible area of the web page with video content by applying a preset full-view style to the video element, including: activating, by the browser, a renderer of the web page to apply the full-view style to the video element, the full-view style being built in the browser during development of the browser;
upon the renderer completes applying the built-in full-view style, creating an independent window different from a window containing the web page;
transferring the video content of the web page into the independent window for playing; and
re-arranging, by the renderer, a layout of the entire web page to adapt to browsing of contents other than the video element in the web page, after the full-view style is applied to the video element.

17. The storage medium according to claim 16, wherein detecting the operating position based on the user operation in the web page of the browser comprises:
generating a mouse move event according to a movement operation of a mouse controlled by a user in the web page of the browser; and
detecting the mouse move event in the web page to generate the operating position of the user operation.

18. The storage medium according to claim 16, wherein after determining whether the operating position is in the video area in the web page, the computer program instructions further cause the at least one processor to perform:
prompting, in the video area of the web page, whether to create an independent window in response to determining that the operating position is in the video area;
detecting a user selection on creating the independent window; and
acquiring the video element corresponding to the operating position in the web page in response to detecting the user selection.

19. The storage medium according to claim 16, wherein after transferring the video content displayed in the web page into the independent window for playing, the computer program instructions further cause the at least one processor to perform:
removing the full-view style from the video element, and applying a default layout style to the video element;
transferring the video content currently played in the independent window into the video area of the web page, and closing the independent window; and
re-arranging a layout of the web page according to the video element to which the default layout style is applied, and displaying the web page having the rearranged layout.

20. The storage medium according to claim 19, wherein after transferring the video content of the web page into the independent window for playing, the computer program instructions further cause the at least one processor to perform:
determining whether a window closing operation sent by the user on the independent window is detected; and
removing the full-view style from the video element and applying the default layout style to the video element, when the window closing operation is detected.

* * * * *